United States Patent
Chrysanthakopoulos

(10) Patent No.: US 6,446,214 B2
(45) Date of Patent: *Sep. 3, 2002

(54) SYSTEM AND METHOD FOR HANDLING POWER STATE CHANGE REQUESTS INITIATED BY PERIPHERAL DEVICES

(75) Inventor: George Chrysanthakopoulos, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,712

(22) Filed: Jun. 8, 1998

(51) Int. Cl.[7] .................................................. G06F 1/26
(52) U.S. Cl. ........................................................ 713/310
(58) Field of Search .............................. 713/300, 310, 713/320, 321, 323, 324, 330, 340

(56) References Cited

U.S. PATENT DOCUMENTS

| | | | | |
|---|---|---|---|---|
| 5,652,890 A | * | 7/1997 | Foster ......................... | 713/323 |
| 5,752,050 A | * | 5/1998 | Hernandez .................. | 713/330 |
| 5,754,798 A | * | 5/1998 | Uehara ........................ | 710/104 |
| 5,812,860 A | * | 9/1998 | Horden ........................ | 713/322 |
| 5,819,100 A | * | 10/1998 | Pearce ......................... | 713/323 |
| 5,842,027 A | * | 11/1998 | Oprescu ...................... | 713/300 |
| 5,845,137 A | * | 12/1998 | Tanaka ........................ | 713/323 |
| 5,854,617 A | * | 12/1998 | Lee .............................. | 345/102 |
| 5,862,389 A | * | 1/1999 | Kardach ...................... | 710/266 |
| 5,884,086 A | * | 3/1999 | Amoni et al. ............... | 713/300 |
| 5,884,087 A | * | 3/1999 | White et al. ................. | 713/310 |
| 5,923,897 A | * | 7/1999 | Lipe et al. ....................... | 710/5 |
| 5,938,771 A | * | 8/1999 | Williams et al. ............ | 713/310 |
| 6,092,209 A | * | 7/2000 | Holzhammer et al. ...... | 713/324 |
| 6,122,745 A | * | 9/2000 | Wong-Insley ............... | 713/300 |

OTHER PUBLICATIONS

Intel, Micorsoft, Toshiba, "Advanced configuration and power interface specification, Rev. 1", Dec. 1996, pp. 3–20–3–22.*

Roberts, Ron, "Information Technology—Reduced Block Commands", Aug. 18, 1999, 47 pages.

"P1394a Draft Standard for a High Performance Serial Bus (Supplement)", The institute of Electrical and Electronics Engineers, Inc., Jun. 30, 1999, 197 pages.

Johansson, Peter, "Information Technology—Serial Bus Protocol 2 (SBP–2)", May 19, 1998, 107 pages.

"American National Standard for Information Systems—Small Computer System Interface–2", American National Standards Institute, 1994, 438 pages.

* cited by examiner

Primary Examiner—John F. Niebling
Assistant Examiner—Stacy A Whitmore
(74) Attorney, Agent, or Firm—Lee & Hayes, PLLC

(57) ABSTRACT

A computer operating system is coupled to intelligent peripheral devices via a peripheral bus architecture that supports unsolicited status requests from peripheral devices. Each peripheral device has local power management that initiates an unsolicited power change request when the device is preparing to change power states. The peripheral bus carries the unsolicited power change request to the operating system. Upon receipt, the operating system issues a power change request directing the peripheral device to perform the power state transition. In this manner, the operating system remains aware of the peripheral device's power state and acts as if it is controlling the device's power state transitions.

9 Claims, 3 Drawing Sheets

SYSTEM AND METHOD FOR HANDLING POWER STATE CHANGE REQUESTS INITIATED BY PERIPHERAL DEVICES

TECHNICAL FIELD

This invention relates to computer operating systems. More particularly, this invention relates to operating systems and methods that handle power state change requests submitted by peripheral devices.

BACKGROUND

Conventional operating systems are designed to manage peripheral devices such as memory drives, monitors, printers, scanners, and so forth. Originally, the peripheral devices were designed to perform only the most rudimentary tasks, while all higher level management was left to the operating system (OS). The peripheral devices were not designed to handle such tasks as power management, allocation of local resources, diagnostics, and so on. Instead, the devices relied almost entirely on the operating system for higher level management and operating decisions.

Over time, the peripheral devices became increasingly more intelligent. Today, many peripheral devices have local controllers and processors to manage internal operation independent of the operating system. It is not uncommon for peripheral devices to perform such tasks as managing their own power consumption, running their own diagnostics, analyzing their current operating efficiency and determining whether improvements can or should be made. The device manufactures tailor the local management controllers to the specific attributes of the device. As a result, the localized controllers are often better at managing the device than the operating system, which tends to be designed more generically across many device platforms.

One area of particular interest is power management. Device manufacturers have developed highly accurate heuristics for managing power consumption within their products. The local controllers implement these product-specific heuristics and tend to ignore power instructions from the operating system, often resulting in better power management.

Unfortunately, localized power management causes a problem in that the operating system may not be aware of the device's current power state. As an example, conventional storage devices have a local power manager that powers down the device to a sleep mode after a specified period of inactivity. The operating system, however, is left unaware of this power state transition. Accordingly, the operating system may still presume that the device is in a ready mode.

The operating system might alternatively attempt to poll the device to see if the storage device is ready and available, or the operating system might attempt to write some cached data to the medium. If the device is currently awake, it can reply to the request or accommodate the cached data. However, if the device is currently asleep (unbeknownst to the operating system), the status request or write operation initiated by the operating system causes the device to wake up before the request can be answered or the write operation performed. This can happen repeatedly if the device continues to power down on its own between each OS-initiated status request or write operation.

As a result, the operating system actually thwarts the local controller's efforts to minimize power consumption by routinely causing the device to change power states. Had the operating system known that the device was asleep, it would not need to send the status request or it would first wake up the device before trying to write cached data.

The inventor has developed an OS-based method for managing power state transitions of intelligent peripheral devices.

SUMMARY

This invention concerns a computer operating system that is designed to manage intelligent peripheral devices having local power management. The operating system is coupled to the peripheral devices via a bus architecture that supports unsolicited status requests from peripheral devices. One particular bus architecture is a high performance serial bus constructed according to the IEEE 1394 specification.

When the local power management decides to change power states, the local power management initiates an unsolicited power change request indicating a new power level. The peripheral bus carries the unsolicited power change request to the operating system. Upon receipt of the unsolicited power change request, the operating system issues a power change request directing the peripheral device to perform the power state transition. In this manner, the operating system remains aware of the peripheral device's power state and in fact, acts as if it is controlling the device's power state transitions.

DETAILED DESCRIPTION

Figure 1:
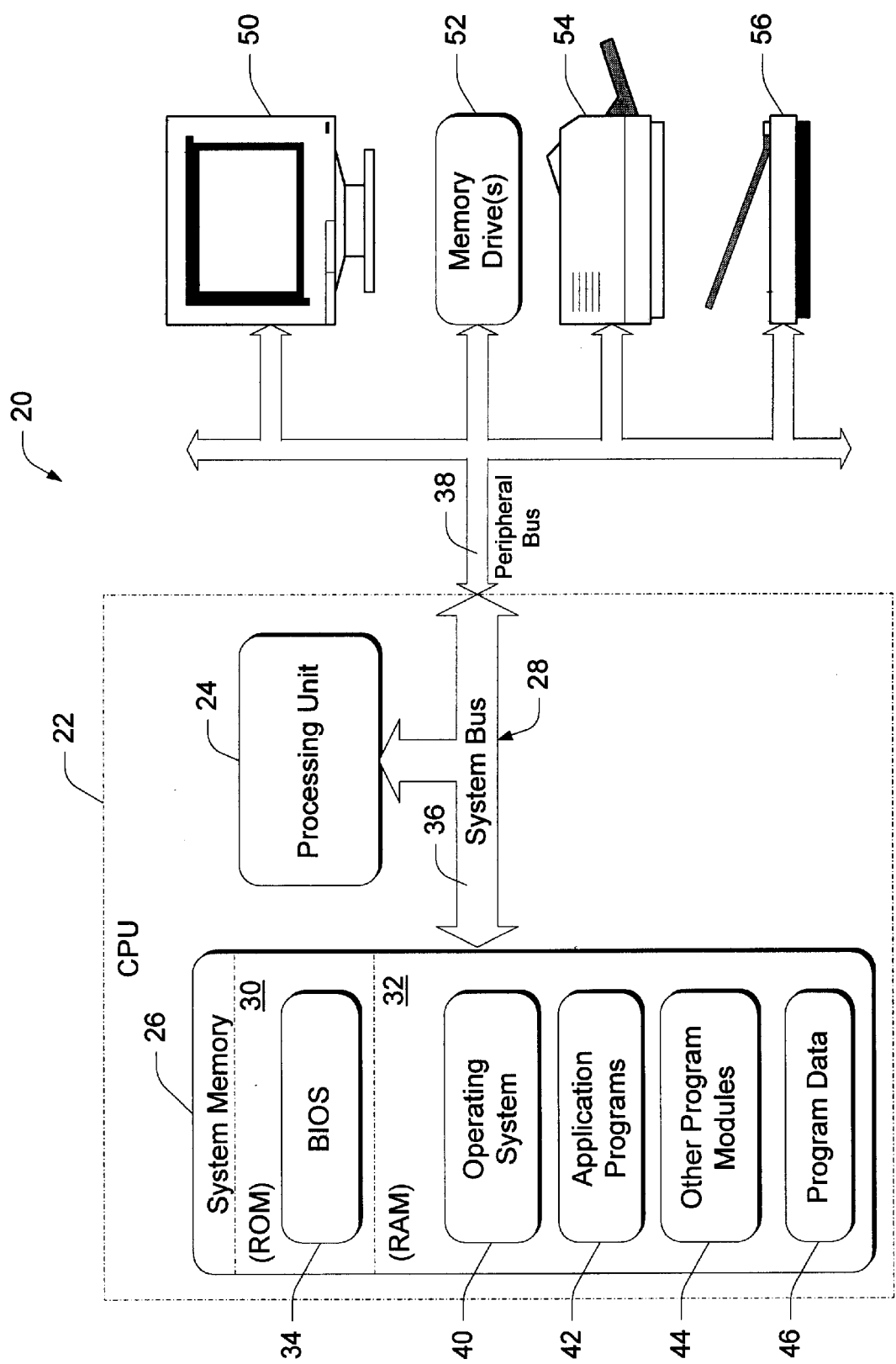
FIG. 1 is a block diagram of functional components in a computer.

FIG. 1 shows functional components of a computer 20. It includes a central processing unit (CPU) 22 having a processor 24, a system memory 26, and a system bus 28 that interconnects the various components. The system memory 26 includes read only memory (ROM) 30 and random access memory (RAM) 32. A basic input/output system 34 (BIOS) is stored in ROM 30. The system bus 28 may be implemented as any one of several bus structures and using any of a variety of bus architectures. It includes a CPU bus structure 36 (e.g., local bus, memory bus, and/or memory controller) and a peripheral bus structure 38.

A number of software modules may be stored in the RAM 32 for execution on the processor 24. These modules include an operating system 40, one or more application programs 42, other program modules 44, and program data 46. The operating system 40 can be any type of operating system, including Windows brand operating systems from Microsoft Corporation (e.g., Windows CE, Windows 98, Windows NT, etc.), Unix-based operating systems, and various other types of operating systems.

The computer 20 has one or more peripheral devices coupled to the system bus 28 and particularly, to the peripheral bus 38. In the illustrated example, the peripheral devices include a monitor 50, one or more memory drives 52 (e.g., hard disk drive, floppy disk drive, optical disk drive, flash memory cards, digital video disks, etc.), a printer 54, and a scanner 56. The illustrated devices are merely representative of various types of peripheral devices and are not intended to form an exhaustive list. Many other peripheral devices may be used.

It is noted that the operating system, programs, and data can be stored on the memory drives 52 in addition to the CPU system memory 26. In this manner, the system memory 26, drives 52, and removable storage media (e.g., floppy disks, CD-ROM, DVD disk, etc.) provide nonvolatile storage of computer readable instructions, data structures, program modules and other data for the computer.

The peripheral devices 50-56 are considered "intelligent" devices in that they have local processing capabilities independent of the computer CPU 22. These local processing capabilities enable the devices to manage themselves apart from any management of the operating system 40. In particular, the devices are implemented with local power management systems. The peripheral devices 50-56 are designed to optimize power usage and are capable of changing power states depending upon current operating conditions. For example, the local power management systems are able to power down their devices when usage is low and to power up the devices when activity resumes. The local power management systems are capable of generating power state change requests that can be submitted to the operating system 40. These requests are unsolicited in that the operating system 40 did not request them.

The peripheral bus 38 is configured to support the unsolicited requests made by the peripheral devices 50-56 to the operating system 40. As one preferred example, the peripheral bus 38 conforms to IEEE 1394, which specifies a standard for a high performance serial bus. The structure of this bus is well known and will, not be described in detail. For more information on the IEEE 1394 serial bus, the reader is directed to the publicly available IEEE 1394-1995 Serial Bus Specification, which is incorporated herein by reference. This specification is available in printed form only from IEEE.

Figure 2:
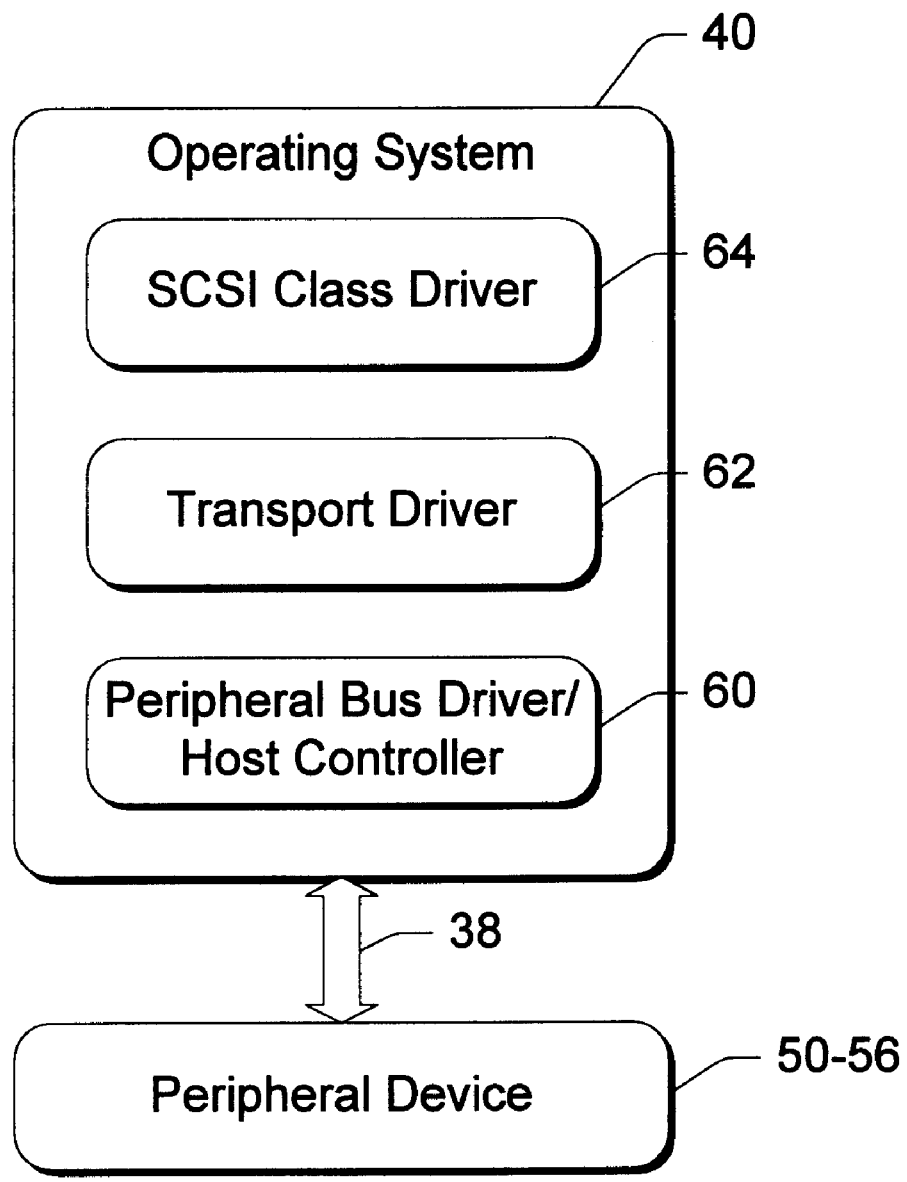
FIG. 2 is a block diagram of a driver architecture implemented in an operating system of the FIG. 1 computer.

FIG. 2 shows an exemplary driver architecture implemented by the operating system 40 to facilitate data communication to and from the peripheral devices over the peripheral bus 38. At the physical level, the operating system 40 implements a peripheral bus driver/host controller driver 60 to handle the physical movement of data over the peripheral bus 38.

Layered atop the bus driver is a transport driver 62 that implements a transport protocol on the underlying peripheral bus 38. The transport driver 62 defines the packet formats for transferring data packets over the peripheral bus 38. As one exemplary implementation, the transport driver 62 is implemented using Serial Bus Protocol 2 (Sbp 2), which is described in the publicly available Serial Bus Protocol 2 Specification at ftp://ftp.symbios.comlpub/standards/io/t10/ drafts. The transport driver also implements a command set dictating what contents are inserted into the protocol packets. One exemplary command set is RBC (reduced block commands), which is described in the publicly available Reduced Block Commands Specification at ftp:// ftp.symbios.com/pub/standards/io/t10/drafts. The RBC specification includes a description of an unsolicited status data format for a power state change request. These specifications are also incorporated herein by reference.

The operating system 40 also implements a SCSI class driver 64, which is layered atop the transport driver. It is noted that other driver architectures with different drivers may be constructed and used within the context of this invention.

Figure 3:
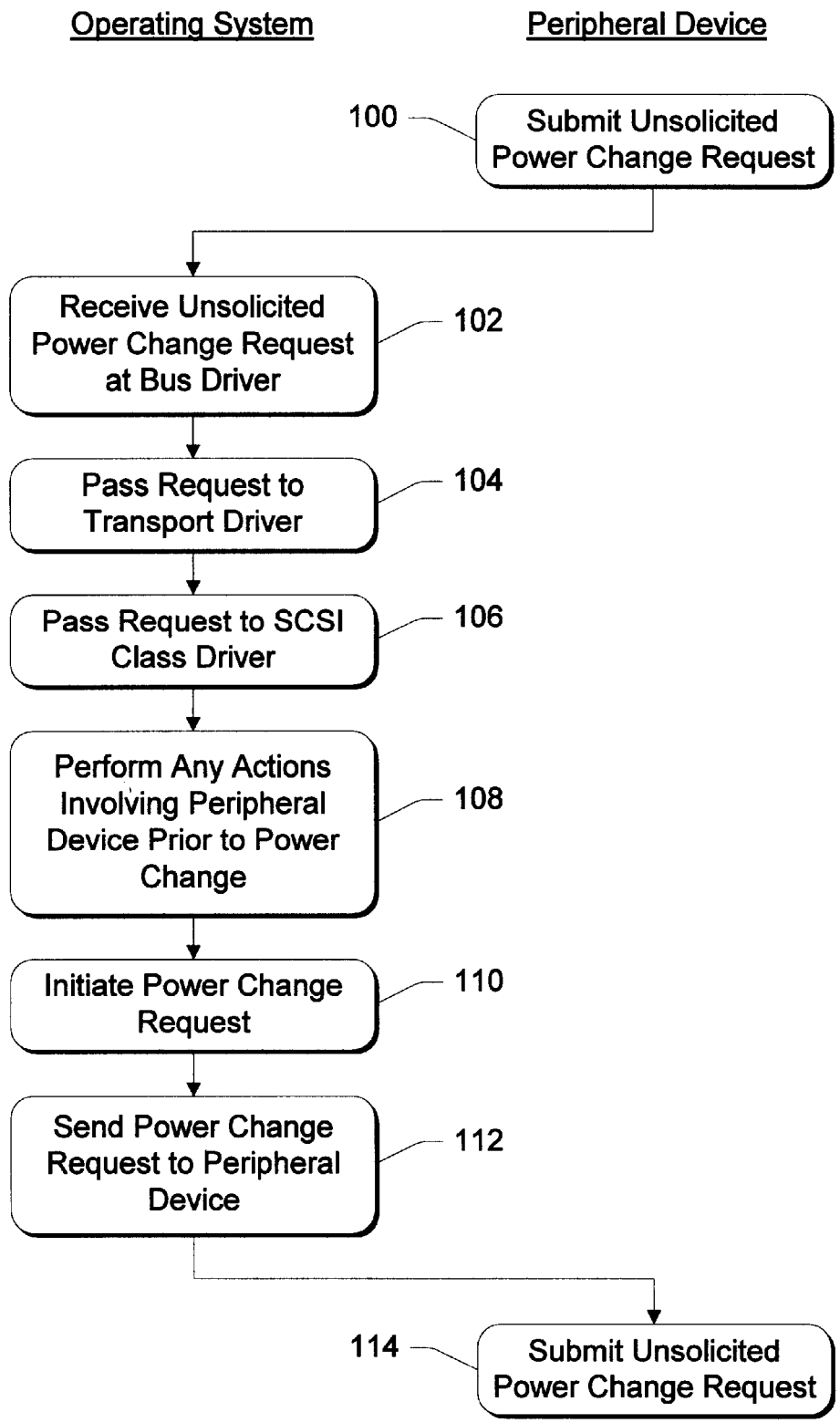
FIG. 3 is a flow diagram showing steps in a method for managing power state changes in a peripheral device.

FIG. 3 shows a method for managing a power state change in a peripheral device. The steps are implemented in software components resident at the peripheral device and at the operating system. At step 100, the peripheral device issues an unsolicited status with power state change request. The unsolicited request is passed over the peripheral bus 38 and received by the host controller driver 60 in the computer operating system 40 (step 102).

Since the request was directed to a pre-allocated address in host memory, the bus driver calls the transport driver's callback associated with the unsolicited status address (step 104). When the transport driver 64 receives the unsolicited request, it calls a predefined routine to initiate a power state change to the new power state requested by the device (step 106). In the Windows NT operating system, this request is made by calling the function "PoRequestPowerlrp". The power state request is sent to the top of the driver stack and handled by each intermediate driver loaded for the requesting peripheral device.

In response to the power state change, the operating system 40 performs any operations and sends any requests to the peripheral device that are warranted by the power change before the peripheral device actually makes the power state transition (step 108). For instance, if the peripheral device is a disk drive that is about to power down, the OS file system might wish to write cached data to the disk drive prior to the power state transition.

Thereafter, the operating system initiates a request to change the power state of the peripheral device to the requested power state (step 110). This is accomplished by issuing, as a final command in the series, a START_STOP_ UNIT command that sets the device in the desired power state. The START_STOP_UNIT command is a standard SCSI command. The transport driver 62 modifies the START_STOP_UNIT command to comply with the RBC command specification.

The transport driver 60 sends the command down to the bus driver 60 and across the bus 38 to the peripheral device (step 112). Upon receipt of the command, the device's local power management system changes the device's power state to the state it originally requested in the unsolicited request (step 114).

As a result, the operating system is kept aware of the current power state of the peripheral device. The operating system does not need to blindly poll the peripheral device for power state status.

It is noted that the system and method described herein are not limited only to the IEEE 1394 bus structure, but can be implemented using other bus architectures that support the capability for unsolicited/asynchronous notification. As an example, the power management system can be implemented by any peripheral device using a command set (e.g., RBC) on any physical bus including, but not limited to, parallel SCSI and Fibre Channel.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a system comprising a host device coupled across an external bus to a peripheral device having local power management, a method for managing a power state transition in the peripheral device, the method comprising:

receiving a status message from the peripheral device indicating that the local power management, independent of any power management policy implemented at the host device, will perform an upcoming power state transition from a first power state to a second power state;

in response to receiving the status message, generating a status received message indicating that the host device is aware that the local power management is placing the peripheral device into the second power state; and sending the status received message to the peripheral device.

2. A method as recited in claim 1, further comprising the host device performing an operation involving the peripheral device before sending the status received message .

3. A method as recited in claim 1, further comprising the host sending a request to the peripheral device before sending the status received message.

4. An operating system stored on a computer-readable storage medium, the operating system comprising computer-executable instructions for:

receiving a status message from a peripheral device over a peripheral bus that is external to a host device controlled by the operating system, the status message informing the operating system that local power management of the peripheral device, independent of any power management policy implemented at the host device, will perform an upcoming power state transition from one power state to another power state;

responsive to receiving the status message, generating a status received message indicating that the host device is aware that the local power management is placing or is going to place the peripheral device into the other power state; and sending the status received message over the peripheral bus to the peripheral device.

5. An operating system as recited in claim 4, further comprising computer-executable instructions for performing an operation involving the peripheral device before sending the status received message.

6. An operating system as recited in claim 4, further comprising computer-executable instructions for sending a request to the peripheral device before sending the status received message.

7. In a system comprising a computer coupled across an external peripheral bus to a peripheral device, the computer comprising a processor operatively coupled to a memory, the computer comprising:

an operating system stored in the memory and executable on the processor, wherein the peripheral device comprises local power management configured to manage transition of the peripheral device between first and second power states, the local power management being capable of communicating an unsolicited status message indicating that local power management of the peripheral device will perform a power state transition between the first and second power states, the power state transition being independent of any power management policy implemented by the operating system; and the operating system being configured to receive the unsolicited status message from the peripheral device over the external peripheral bus and in response, to issue a status received message indicating that the operating system is aware that the local power management is placing, or is going to place, the peripheral device into the other power state.

8. A computer as recited in claim 7, wherein the operating system is further configured to perform an operation involving the peripheral device before issuing the status received message.

9. A computer as recited in claim 7, wherein the operating system is further configured to send one or more requests to the peripheral device before issuing the status received message.

* * * * *

UNITED STATES PATENT AND TRADEMARK OFFICE
CERTIFICATE OF CORRECTION

PATENT NO. : 6,446,214 B2
DATED : September 3, 2002
INVENTOR(S) : Chrysanthakopoulos It is certified that error appears in the above-identified patent and that said Letters Patent is hereby corrected as shown below:

<u>Column 3,</u>
Line 50, replace "ftp://ftp.symbios.com1pub/standards/io/t10/drafts." with
-- ftp://ftp.symbios.com/pub/standards/io/t10/drafts. --.

<u>Column 4,</u>
Line 13, replace " "PoRequestPower1rp"." with -- "PoRequestPowerlrp". --.

Signed and Sealed this

Fourth Day of February, 2003

JAMES E. ROGAN
*Director of the United States Patent and Trademark Office*